July 22, 1958  J. WITHERSPOON, JR  2,844,321
PROPORTIONATE FLOW CONTROL DEVICE
Filed Oct. 16, 1956  3 Sheets-Sheet 1

INVENTOR.
Jack Witherspoon Jr.

BY Albert J. Henderson
HIS ATTORNEY.

July 22, 1958   J. WITHERSPOON, JR   2,844,321
PROPORTIONATE FLOW CONTROL DEVICE
Filed Oct. 16, 1956   3 Sheets-Sheet 2

INVENTOR.
Jack Witherspoon Jr.
BY
*HIS ATTORNEY.*

July 22, 1958  J. WITHERSPOON, JR  2,844,321
PROPORTIONATE FLOW CONTROL DEVICE
Filed Oct. 16, 1956  3 Sheets-Sheet 3

INVENTOR.
Jack Witherspoon Jr.
BY
HIS ATTORNEY.

United States Patent Office 2,844,321
Patented July 22, 1958

2,844,321

PROPORTIONATE FLOW CONTROL DEVICE

Jack Witherspoon, Jr., Knoxville, Tenn., assignor to Robertshaw-Fulton Controls Company, Greensburg, Pa., a corporation of Delaware Application October 16, 1956, Serial No. 616,167

4 Claims. (Cl. 236—12)

This invention relates to a device for controlling the proportionate flow of different temperature fluids and more particularly to an electrically operated valve for alternately controlling the flow of different temperature fluids in response to predetermined temperature changes in the fluid discharged by the valve.

One of the objects of the present invention is to selectively vary the proportionate flow of different temperature fluids in a proportionate flow control device by selectively controlling the actuation of a plurality of thermally responsive switches.

Another object of the invention is to control the operation of a proportionate flow control device to supply either a single fluid or varying proportions of different temperature fluids.

Another object of the invention is to selectively control the actuation of a plurality of thermally responsive switches in a proportionate flow control device by means of a timer apparatus.

Another object of the invention is to calibrate a proportionate flow control device by varying the position of the thermally responsive switches relative to the thermal element.

Another object of the invention is to unitarily support a calibration means, a thermal element, and a plurality of thermally responsive switches in a proportionate flow control device whereby they may be installed or removed as a unit without destroying the calibration of the device.

These and other objects of the invention will become apparent from the following description taken in connection with the accompanying drawings wherein.

Figure 1:
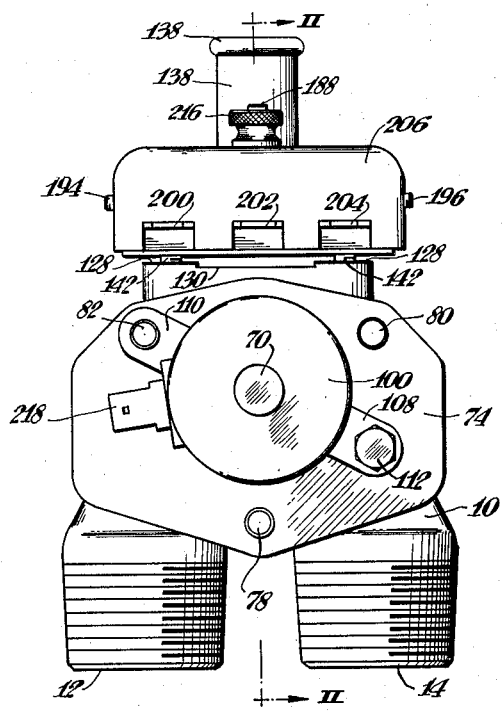
Fig. 1 is an end elevation of the device.
Figure 2:
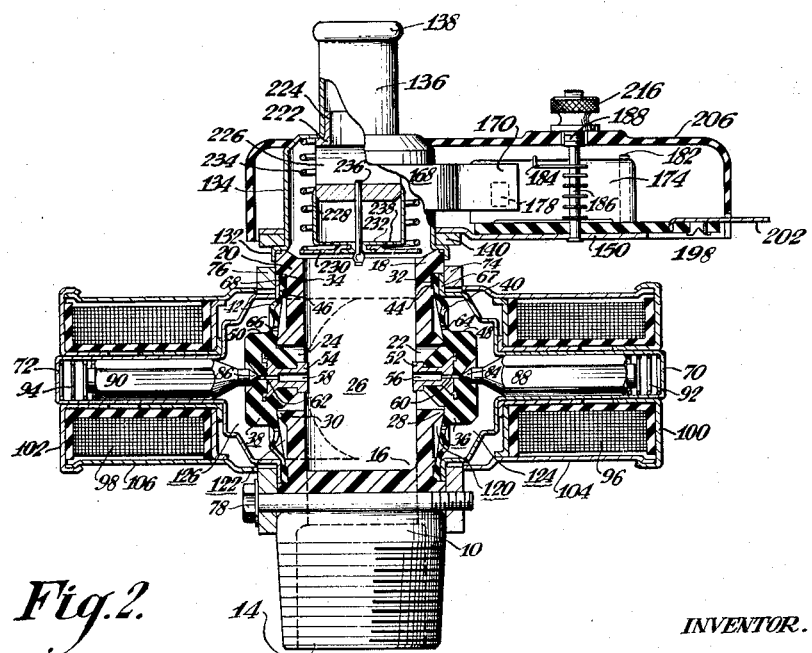
Fig. 2 is a section taken along the line II—II of Fig. 1 with some of the parts shown in fragmentary elevation.
Figure 5:
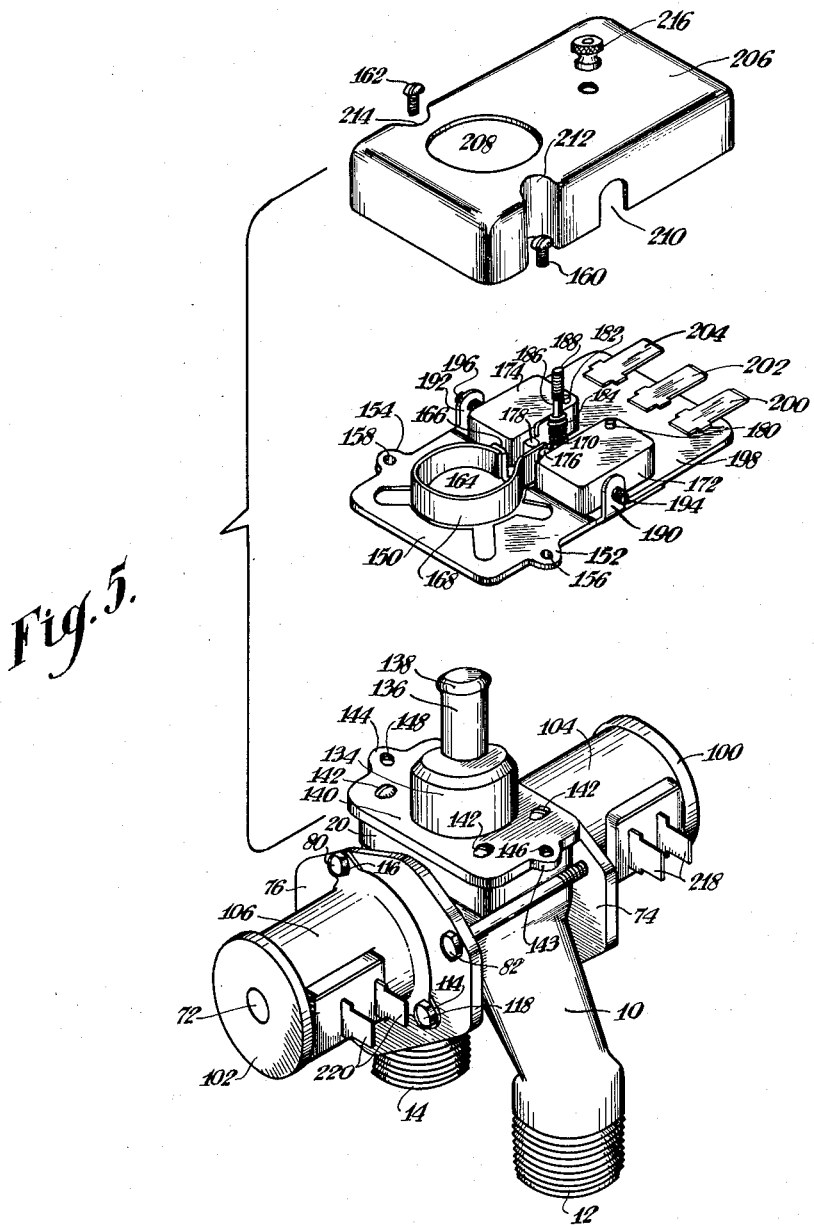
Fig. 5 is a perspective view of some of the parts of the device prior to assembly.

Referring more particularly to Figs. 1, 2, and 5, the device includes a valve casing 10 provided with a pair of threaded inlet nipples 12 and 14 thereon which may be connected by any suitable means to a source of relatively "hot" and "cold" temperature fluids, respectively. Each of the inlet nipples communicates with an upwardly extending passage in the interior of the valve casing 10 (only one passage 16 being shown in Fig. 2 in dotted lines), and each upwardly extending passage terminates in an outlet (not shown) in one of the opposite walls 18 and 20 of the valve casing. To be more specific, hot fluid entering inlet nipple 14 will flow through upwardly extending passage 16 and be discharged through an outlet in casing wall 20 and cold fluid entering inlet nipple 12 will flow through a similar upwardly extending passage in the interior of the valve casing 10 and be discharged through an outlet in casing wall 18.

Casing walls 18 and 20 are provided with a pair of apertures or passages 22 and 24, respectively, therein which provide access for the flow of fluid into an elongated, centrally disposed chamber 26 in valve casing 10. The outer faces of casing walls 18 and 20 have a pair of valve seats 28 and 30, respectively, formed thereon and are also provided with a pair of annular recesses 32 and 34, respectively, therein. Valve seats 28 and 30 are adapted to seat a pair of pressure differential diaphragm valves, generally designated by the reference numerals 36 and 38, respectively, for controlling the flow of different temperature fluids through chamber passages 22 and 24. The diaphragm valves 36 and 38 are comprised of a pair of annular diaphragms 40 and 42, respectively, which terminate in their outer extremities in annular beads 44 and 46, respectively, and which have valve members 48 and 50, respectively, integrally formed therewith.

Valve members 48 and 50 carry a pair of plugs 52 and 54, respectively, which are provided with a pair of longitudinally extending passages 56 and 58, respectively, therein. Passages 56 and 58 in plugs 52 and 54, respectively, are adapted to register with a similar pair of passages 60 and 62, respectively, extending through valve members 48 and 50, respectively, at the approximate geometric centers thereof. It will also be noted that the diaphragms 40 and 42 are provided with a plurality of bleed passages 64 and 66, respectively, therein.

Diaphragm beads 44 and 46 are seated in recesses 32 and 34, respectively, in the valve casing walls and are retained therein by the terminal flanges 67 and 68 of a pair of elongated casing members 70 and 72, respectively. The flanges 67 and 68 are in turn tightly urged into engagement with diaphragm beads 44 and 46, respectively, by means of a pair of yoke members 74 and 76, respectively, which are rigidly clamped to the outer surface of casing walls 18 and 20, respectively, by three bolts 78, 80, and 82.

Passages 60 and 62 in valve members 48 and 50 are adapted to be opened and closed by the conical tips 84 and 86 of a pair of pilot valve 88 and 90, respectively, which are slidably retained within elongated casing members 70 and 72. A pair of compression springs 92 and 94 are seated within elongated casing members 70 and 72, respectively, to constantly urge the pilot valve members 88 and 90 toward the "closed" position.

Pilot valves 88 and 90 are in effect the armatures of a pair of solenoids 96 and 98, respectively, which are alternately energized, as will be discussed more in detail hereinafter, to alternately open and close valve member passages 60 and 62 to control the alternate flow of the different temperature fluids through the chamber passages 22 and 24. Solenoids 96 and 98 are mounted within and insulated from a pair of metal spools 100 and 102, respectively, and are sheathed by a pair of annular casing members 104 and 106. Casing member 104 is provided with a pair of diametrically opposed ears 108 and 110 (Fig. 1) on the inner end thereof which are secured by bolts 112 and 82, respectively, to yoke member 74, and casing member 106 is, likewise, provided with a pair of diametrically opposed ears 114 and 116 (Fig. 5) on the inner end thereof which are secured to yoke member 76 by bolts 118 and 80, respectively.

When solenoids 96 and 98 are de-energized, both of the diaphragm valves 36 and 38 are normally maintained in the "closed" position as shown in Fig. 2. Fluids flowing through the inlet nipples 12 and 14 will flow through the upwardly extending passages in the interior of the valve casing 10 and will be discharged into chambers 120 and 122, respectively, formed between the inner surfaces of the diaphragm valves 36 and 38 and casing walls 18 and 20. Fluid under pressure in chambers 120 and 122 will then pass through bleed passages 64 and 66 in diaphragm valves 36 and 38 and will fill chambers 124 and 126 surrounding the outer surface of the diaphragm valves.

Inasmuch as the exposed surface area of diaphragm valves 36 and 38 in chambers 124 and 126 is much greater than the exposed surface area in chamber 120 and 122, the diaphragm valves 36 and 38 will be urged into engagement with valve seats 28 and 30 by a differential fluid pressure acting thereon. Compression springs 92 and 94 constantly urge the pilot valves 88 and 90 inwardly into engagement with the diaphragm valves 36 and 38 to seal passages 60 and 62 to maintain this fluid pressure differential.

However, if the solenoids 96 and 98 are energized, pilot valves 88 and 90 will be moved outwardly against the bias of springs 92 and 94 to open the passages 60 and 62 in valve members 48 and 50. When passages 60 and 62 are opened, the fluid pressure on both sides of the diaphragm valves 36 and 38 will become equalized, and the fluid pressure within chambers 120 and 122 will unseat the diaphragm valves 36 and 38 to permit the flow of fluids through casing chamber passages 22 and 24. Inasmuch as pressure differential diaphragm valves of this type are well known in the art, further discussion thereof is deemed unnecessary.

Referring again to Figs. 1, 2, and 5, the upper end of valve casing chamber 26 is "open," and the upper end wall 128 of valve casing 10 is provided with annular recess 130 therein (Fig. 1). Annular recess 130 is adapted to seat the annular flanged foot 132 (Fig. 2) of an annular housing or proportioning chamber 134. Proportioning chamber 134 is reduced in diameter at the upper end thereof to provide an elongated discharge conduit 136, and conduit 136 is provided with an annular bead 138 on the terminal end thereof for the reception of a resilient conduit or the like.

Proportioning chamber 134 is retained in fluid-tight engagement on the upper end wall 128 of valve casing 10 by a substantially rectangular shaped plate 140. A plurality of screws 142 extend through the plate 140 and rigidly anchor the plate to the upper end wall 128 of the valve casing. Plate 140 is also provided with a pair of opposed ears 142 and 144 thereon which have a pair of threaded apertures 146 and 148, respectively, extending therethrough.

Plate 140 is adapted to detachably carry another substantially rectangular plate or supporting means 150. Plate 150 is provided with a pair of opposed ears 152 and 154 thereon which are adapted to register with the pair of ears 142 and 144 on plate 140, and the ears 152 and 154 are provided with a pair of apertures 156 and 158, respectively, therein for the reception of a pair of bolts 160 and 162.

Figure 3:
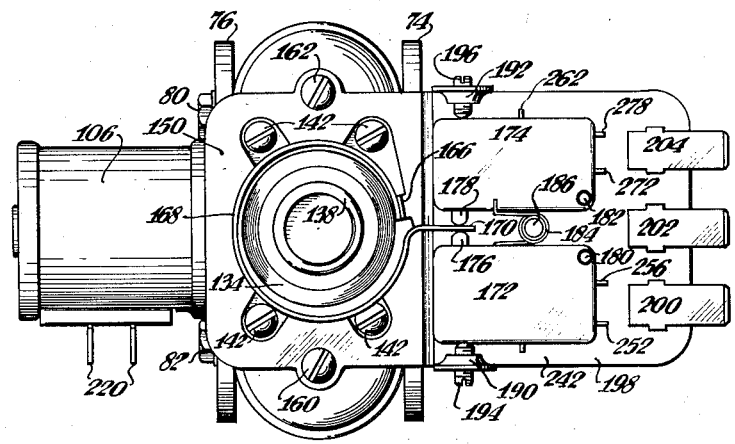
Fig. 3 is a top plan view of the device with the switch housing removed and the wiring omitted.

Plate 150 (Figs. 3 and 5) is provided with a hole 164 therein which, in the assembled position of plates 140 and 150 (Figs. 2 and 3), is adapted to accommodate the passage therethrough of proportioning chamber 134, the inner diameter of hole 164 being slightly larger than the outer diameter of proportioning chamber 134. Plate 150 is also provided with an upstruck ear 166 adjacent the periphery of hole 164 which anchors one end of a circularly curved, bimetallic thermal element 168. Thermal element 168 is curved and dimensioned to closely fit the outer periphery of proportioning chamber 134 in order to accurately reflect the changes in temperature of the fluids flowing therethrough.

The free end 170 of thermal element 168 is bent outwardly and cooperates with a pair of single pole, double-throw snap-switches 172 and 174 to control the alternate energization of the pair of solenoids 96 and 98, the free end 170 of the thermal element 168 being movable between a plurality of controlling positions relative to the snap-switches 172 and 174 in response to predetermined temperature changes of the fluid flowing through proportioning chamber 134. End 170 of the thermal element 168 is positioned between a pair of thrust buttons 176 and 178 carried by the snap-switches 172 and 174, respectively, which when moved inwardly or outwardly of the snap-switches control the actuation thereof.

Snap-switches 172 and 174 (Figs. 3 and 5) are pivotally attached to plate 150 by pins 180 and 182, respectively, and are urged in opposite directions transversely of plate 150 by a spring 184 which is carried on an upstanding pin 186 mounted on plate 150. The upper end of upstanding pin 186 is threaded at 188.

Plate 150 is also provided with a pair of opposed upstruck ears 190 and 192 which carry a pair of screws 194 and 196, respectively. The inner ears of the screws 194 and 196 abut the snap-switches 172 and 174 and thus provide a calibration means for the device to selectively vary the position of the two snap-switches relative to the free end 170 of the thermal element 168 or to thereby selectively vary the predetermined movement of the free end 170 of the thermal element 168 necessary to produce actuation of the two snap-switches.

With respect to the actuation of the two snap-switches 172 and 174, it might be noteworthy to mention that each snap-switch is separately and independently actuated to control the cyclic and alternate energization of the solenoids 96 and 98 and the resultant cyclic and alternate opening and closing of the diaphragm valves 36 and 38. As will be discussed more in detail hereinafter, snap-switch 174 is actuated during a first predetermined range of movement of the movable end 170 of the thermal element 168 in response to a first predetermined change in the temperature of the fluids flowing through proportioning chamber 134 to produce a first proportionate flow of different temperature fluids, and snap-switch 172 is actuated during a second predetermined range of movement of the movable end 170 of the thermal element 168 in response to a second predetermined change in the temperature of the fluids flowing through proportioning chamber 134 to produce a second proportionate flow of different temperature fluids.

Plate 150 also has attached thereto by any suitable means a sheet of insulating material 198 which carries three terminals 200, 202, and 204, the three terminals extending longitudinally beyond sheet 198 and attached thereto by any suitable means.

Supporting plate 150 and most of the components carried thereby are shielded by a housing or switch cover 206 having a hole 208 therein for the passage therethrough of proportioning chamber 134 when the switch housing 206 is in the assembled position as best shown in Fig. 2. Switch housing 206 (Fig. 5) is provided with a pair of opposed cut-away portions 210 therein (only one cut-away portion being shown) to accommodate the reception of ears 190 and 192 on plate 150 and is provided with a pair of opposed recesses 212 and 214 on the outer surface thereof which provide access to bolts 160 and 162. Switch casing 206 is retained in position on plate 150 by a knurled nut 216 which is threadedly received on the threaded portion 188 of upstanding pin 186.

With the thermal element 168, the snap-switches 172 and 174, and the calibration screws 194 and 196 carried as a unit by the plate 150, it will be noted that the entire unit can be installed or removed by the mere placement or removal of the pair of bolts 160 and 162. The entire unit can be installed or removed without the removal of the switch housing 206 and, furthermore, without destroying the calibration of the device.

As best shown in Fig. 5, solenoids 96 and 98 are provided with a set of pronged terminals 218 and 220, respectively, thereon for connection to suitable electrical lines (not shown) leading to each of the snap-switches 172 and 174.

In order to insure a constant flow of fluid through proportioning chamber discharge conduit 136, a constant flow valve is positioned in the proportioning chamber 134 between the discharge conduit 136 and the "open" upper end of valve casing chamber 26. The constant flow valve may be of any suitable type but is here shown in Fig. 2 as comprising an axially bored stud 222 provided with a reduced diameter portion 224 which is fixed by any suitable means within the inner bore of discharge conduit 136. Stud 222 is also provided with a transverse passage 226 therein by means of which fluids may flow into the hollow interior thereof.

A tubular member 228 is mounted for reciprocation on the stud 222 and when in an upper position is operative to reduce the inlet area of the transverse passage 226. A disc 230 is attached to the lower end wall 232 of the tubular member 228 by any suitable means and seats a spring 234 mounted in compression between the disc 230 and the proportioning chamber 134. A pin 236 having one end thereof fixed within stud 222 and the other end thereof extending through disc 230 provides an abutment which limits the movement of disc 230 and tubular member 228. End wall 232 of tubular member 228 is also provided with a plurality of bleed passages 238 therein to equalize the fluid pressure on both sides thereof.

The constant flow valve thus described operates in a manner well known in the art. Fluid flowing in valve casing chamber 26 and discharge conduit 136 exerts its pressure on the lower side of the disc 230 and tends to move the disc 230 against the bias of spring 234. Accordingly, the pressure of the fluid in discharge conduit 136 positions the tubular member 228 on stud 222 and thereby controls the flow of fluid through transverse stud passage 226.

*Operation*

Figure 4:
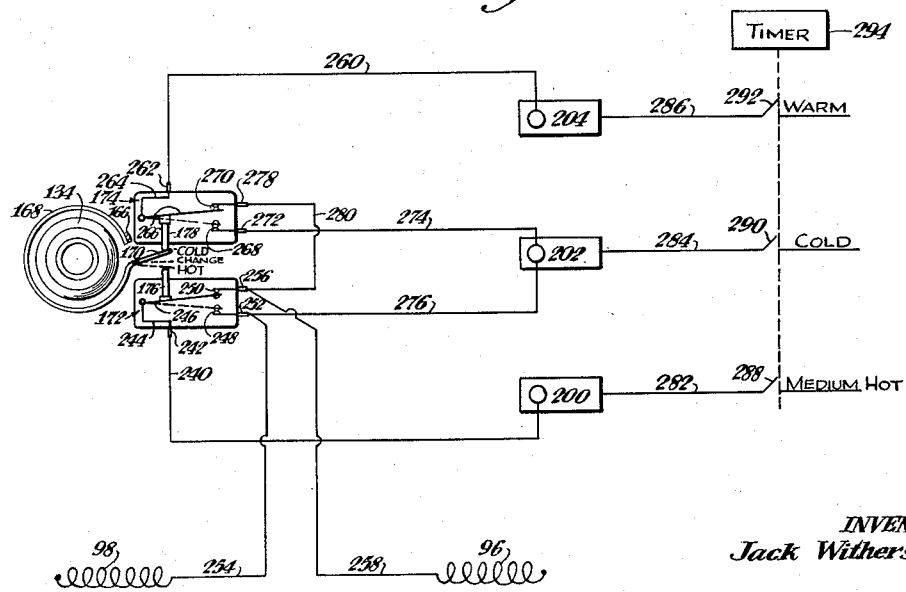
Fig. 4 is a schematic illustration of the device including a timer apparatus.

Referring more particularly to Fig. 4, the electric circuiting arrangement for controlling the operation of the snap-switches and the energization of the solenoids is shown schematically as including a line 240 extending between terminal 200 and a terminal 242 on snap-switch 172. Terminal 242 is connected by a line 244 to a single pole, double-throw switch arm 246 and snap-switch 172 which is "snap" actuated between a pair of fixed switch contacts 248 and 250. Swith arm 246 is operatively connected to the thrust button 176 of snap-switch 172 and is movable between fixed contacts 248 and 250 in response to a predetermined range of movement of the end 170 of the thermal element 168, the predetermined range of movement of thermal element end 170 being responsive to a predetermined change in temperature of the fluids flowing through proportioning chamber 134.

Fixed contact 248 is connected to terminal 252 on snap-switch 172 which in turn is connected by a line 254 to solenoid 98, solenoid 98 controlling the alternate opening and closing of diaphragm valve 38 to regulate the flow of the "cold" or low temperature fluid through the casing chamber passage 24.

Fixed contact 250 is connected to terminal 256 on snap-switch 172 which in turn is connected by line 258 to solenoid 96, solenoid 96 controlling the alternate opening and closing of diaphragm valve 36 to regulate the flow of the "hot" or high temperature fluid through casing chamber passage 22.

Terminal 204 is connected by a line 260 to a terminal 262 on snap-switch 174. Terminal 262 is connected by a line 264 to a single pole, double-throw switch arm 266 in snap-switch 174 which is "snap" actuated between a pair of fixed switch contacts 268 and 270. Switch arm 266 is operatively connected to the thrust button 178 of snap-switch 174 and is movable between the fixed switch contacts 268 and 270 during a predetermined range of movement of the end 170 of thermal element 168, the predetermined range of movement of the thermal element end 170 being responsive to a predetermined change in the temperature of the fluids flowing through the proportioning chamber 134.

Switch contact 268 is connected to terminal 272 on snap-switch 174 which in turn is connected by a line 274 to terminal 202. Terminal 202 is connected by a line 276 to terminal 252 on snap-switch 172. Switch contact 270 is connected to a terminal 278 on snap-switch 174 which is connected by a line 280 to terminal 256 on snap-switch 172.

The three terminals 200, 202, and 204 are connected to an external source of current by three line wires 282, 284, and 286, respectively, which are provided with a plurality of line switches 288, 290, and 292 therein. A timer apparatus 294 is operatively connected to each of the line switches 288, 290, and 292 to sequentially control the opening and closing thereof.

Prior to being set into operation, the component parts of the subject device will remain, at room temperatures (70°–80° F.), in the positions shown schematically in Fig. 4, line switches 288, 290, and 292 all being open and switch arms 246 and 266 being in contact with snap-switch contacts 250 and 270, respectively. It will be noted that the movable end 170 of the thermal element 168 is bent obliquely outward at such an angle that at normal room temperatures it will always be in its "cold" or solid-line position whereby it will have "snapped" the switch arm 266 of snap-switch 174 into engagement with contact 270.

If it is desired to operate the subject device to first supply a relatively "warm" proportionate flow of different temperature fluids (a "warm" proportionate flow comprising two different temperature fluids which when mixed in a tub or the like will yield a mixture temperature of about 100° F.), timer 294 is set to first close line switch 292. With line switch 292 closed, current will flow through lead wire 286, through terminal 204, through line 260, through switch terminal 262, through line 264, through switch arm 266, through switch contact 270, through switch terminal 278, through line 280, through switch terminal 256, through line 258, and to solenoid 96. Solenoid 96 will thus become energized and open diaphragm valve member 36 to permit a flow of relatively "hot" fluid through proportioning chamber 134. Thermal element 168, meanwhile, will expand in response to the increase in temperature of proportioning chamber 134 and the movable end 170 thereof will be moved downwardly as shown in Fig. 4 or toward snap-switch 172.

After a predetermined temperature change of proportioning chamber 134, the movable thermal element end 170 will be moved through a predetermined range of movement to the "change" or dotted-line position wherein the switch arm 266 of snap-switch 174 will be "snapped" out of engagement with the switch contact 270 and into engagement with switch contact 268 (dotted-line position). Solenoid 96 will now become de-energized and the flow of a relatively "hot" fluid through proportioning chamber 134 will be terminated.

With switch arm 266 of snap-switch 174 in contact with snap-switch contact 268, solenoid 98 will now become energized and permit a flow of a relatively "cold" fluid through proportioning chamber 134. With snap-switch contact 268 being closed, current will flow through line wire 286, through terminal 204, through line 260, through switch terminal 262, through line 264, through switch arm 266, through switch contact 268, through switch terminal 272, through line 274, through terminal 202, through line 276, through switch terminal 252, through line 254, and to solenoid 98.

Thermal element 168 will now contract in response to the drop in temperature of proportioning chamber 134 and the movable end 170 thereof will be moved back toward its original or full-line position. After a predetermined decrease in temperature of proportioning chamber 134, the movable end 170 of thermal element 168 will be moved through a predetermined range of movement and returned to its original or full-line position, wherein switch arm 266 of snap-switch 174 will be "snapped" out of engagement with switch contact 268 and into engagement with switch contact 270. Solenoid 98 will now become de-energized to terminate the flow of a relatively "cold" fluid through proportioning chamber 134, and solenoid 96 will again be energized to start the flow of a relatively "hot" fluid through proportioning chamber 134.

Thus, it can readily be seen that as long as line switch 292 remains closed, the two solenoids 96 and 98 will be cyclically and alternately energized by snap-switch 174 in response to predetermined changes in the temperature of the fluids flowing through proportioning chamber 134 to thereby provide a first proportionate flow of different temperature fluids. This first proportionate flow of "hot" and "cold" fluids alternately and cyclically flowing through proportioning chamber 134 is usually discharged into a washtub or the like (not shown in the drawing) wherein the two fluids become co-mingled to yield a resultant tub temperature of the desired degree, the resultant tub temperature being a function of the percentage or amount of each fluid comprising the proportionate flow.

If it is desired to vary the proportions or percentages of the "hot" and "cold" fluids comprising this first proportionate flow, this can be effected by the adjustment of calibration screw 196 (Fig. 3) to shift the position of snap-switch 174 relative to the movable end 170 of the thermal element 168. If the calibration screw is moved inwardly (viewing Fig. 3) to move the snap-switch 174 and the thrust button 178 thereof downwardly (viewing Fig. 4) the percentage of "hot" fluid will be increased since a greater amount of "hot" fluid must flow through proportioning chamber 134 to produce the predetermined range of movement of the thermal element movable end 170 necessary to permit the switch arm 266 to be "snapped" into engagement with switch contact 268. Conversely, if calibration screw 196 is adjusted to shift the position of thrust button 178 upwardly (viewing Fig. 4), the percentage of "cold" fluid will be increased since a greater amount of "cold" fluid must flow through proportioning chamber 134 to produce the necessary deflection of movable end 170 to permit the switch arm 266 to be "snapped" into engagement with switch contact 270.

Once the position of the snap-switch 174 is set or adjusted to produce the desired first proportionate flow of different temperature fluids, the percentages of the "hot" and "cold" fluids will remain constant unless the fluids themselves undergo a change in temperature. In this event, the percentages of the "hot" and "cold" fluids flowing through proportioning chamber 134 will be changed, but the resultant tub temperature, hereinbefore mentioned, will remain the same.

For example, if the temperature of the "hot" fluid should increase after snap-switch 174 has been adjusted to the desired position, the rate of movement or deflection of thermal element movable end 170 would also increase in response to a higher temperature fluid flowing through proportioning chamber 134. This increased rate of deflection of movable end 170 will consequently shorten the flow period of the "hot" fluid and, therefore, reduce the amount of "hot" fluid that is passed through proportioning chamber 134 and discharged into the washtub or the like to maintain a substantially constant predetermined tub temperature. Likewise, if the temperature of the "cold" fluid should decrease, the rate of deflection of the thermal element movable end 170 would also be correspondingly increased to effect a reduction in the volume of flow of the "cold" fluid.

After a predetermined length of time, depending on the desired setting of the timer apparatus 294, timer apparatus 294 will open line switch 292 and close line switch 290 whereby the subject device will cease to supply a proportionate flow of different temperature fluids and supply only a single fluid. With line switch 290 closed, the current will flow through line wire 284, through terminal 202, through line 276, through snap-switch terminal 252, through line 254, and to solenoid 98. Solenoid 98 will thus become energized and permit the flow of a "cold" fluid through proportioning chamber 134. As long as line switch 290 remains closed and line switches 288 and 292 remain open, solenoid 98 will be constantly energized since snap-switches 172 and 174 are incapable of completing the circuit to the other solenoid 96.

After another predetermined length of time, depending on the desired setting of timer apparatus 294, timer apparatus 294 will open line switch 290 and close line switch 288 to thereby supply a second proportionate flow of different temperature fluids. With line switch 288 being closed, the cyclic and alternate energization of solenoids 96 and 98 will be controlled by snap-switch 172, and the movable end 170 of thermal element 168 will control the actuation of snap-switch 172 in moving through a second predetermined range of movement, moving between the "change" dotted-line position and the "hot" dotted-line position. The movable end 170 of the thermal element 168 in moving through the second predetermined range of movement will control the cyclic and alternate energization of the two solenoids 96 and 98 to supply a second proportionate flow of different temperature fluids which is comprised of a higher percentage of the "hot" temperature fluid than the "cold" temperature fluid. This higher percentage of the "hot" fluid results from the fact that a greater amount of "hot" fluid must flow through proportioning chamber 134 in order to produce the necessary increased deflection of thermal element movable end 170 to actuate snap-switch 172.

If it is desired to vary the percentages of the "hot" and "cold" fluids comprising this second proportionate flow of different temperature fluids, this can be effected, as was hereinbefore discussed in connection with snap-switch 174, by the adjustment of calibration screw 194 (Fig. 3) to shift the position of snap-switch 172 relative to the movable end 170 of the thermal element 168.

While the subject proportionate flow control device has been herein shown and described in connection with a timer apparatus 294 for controlling the sequential opening and closing of the three line switches 288, 290, and 292, it will be appreciated that the timer apparatus 294 could be eliminated and that the line switches 288, 290, and 292 could be manually opened and closed to produce the same result.

Furthermore, it will also be appreciated that more than three line switches or control circuits could be used in combination with the subject device. Quite obviously, the subject device could be modified to include a "fourth" line switch for controlling the separate and independent energization of the "hot" solenoid 96 to provide a continuous flow of "hot" fluid in the same manner in which line switch 290 provides a continuous flow of "cold" fluid. This "fourth" line switch could easily effect this result by merely being connected in circuit with line 280 or line 258 (Fig. 4).

Accordingly, while only one embodiment of the present invention has been herein shown and described, it will be apparent to those skilled in the art that the construction and arrangement of parts may be variously embodied or changed without departing from the scope of the invention as defined in the appended claims.

It is claimed and desired to secure by Letters Patent:

1. A device for proportioning different temperature fluids comprising a valve body having a pair of inlet passages for different temperature fluids, a pair of valve means in said body for controlling said passages respectively, electrically operable means for operating said valve means, a substantially cylindrical hollow projection on said body communicating with said inlet passages and forming an outlet therefor, support means carried on said body and apertured to receive said projection, a substantially cylindrical bimetal element extending around said projection and subject to the temperature of the fluid in said outlet, said element having a relatively stationary end secured to said support means and a free end movable in response to temperature variations in the outlet fluid, a pair of switch means mounted on said support means and operably associated with said free end for alternative operation thereby, and circuit connections between said switch means and said electrically operable means effective for causing alternative operation of said valve means for proportioning the flow of fluids from said inlet passages to said outlet.

2. A device for proportioning different temperature fluids comprising a valve body having a pair of inlet passages for different temperature fluids, a pair of valve means in said body for controlling said passages respectively, electrically operable means for operating said valve means, a substantially cylindrical hollow projection on said body communicating with said inlet passage and forming an outlet therefor, support means carried on said body and apertured to receive said projection, a substantially cylindrical bimetal element extending around said projection and subject to the temperature of the fluid in said outlet, said element having a relatively stationary end secured to said support means and a free end movable in response to temperature variations in the outlet fluid, a pair of switch means adjustably mounted on said support means and operably associated with said free end for alternative operation thereby, circuit connections between said switch means and said electrically operable means effective for causing alternative operation of said valve means for proportioning the flow of fluids from said inlet passages to said outlet, and adjustment means carried by said support means for varying the position of said switch means relative to said free end of said bimetal element.

3. A device for proportioning different temperature fluids comprising a valve body having a pair of inlet passages for different temperature fluids, a pair of valve means in said body for controlling said passages respectively, electrically operable means for operating said valve means, a substantially cylindrical hollow projection on said body communicating with said inlet passages and forming an outlet therefor, support means carried on said body and apertured to receive said projection, a substantially cylindrical bimetal element extending around said projection and subject to the temperature of the fluid in said outlet, said element having a relatively stationary end secured to said support means and a free end movable in response to temperature variations in the outlet fluid, a pair of switch means pivotally mounted on said support means on opposite sides respectively of said free end, said switch means each having an operating portion for operative engagement with said free end, means for biasing said switch means on said pivotal mounting and tending to cause disengagement of said operating portion from said free end, circuit connections between said switch means and said electrically operable means effective upon said operative engagement for causing alternative operation of said valve means for proportioning the flow of fluids from said inlet passages to said outlet, and adjustment means carried by said support means for overcoming said biasing means and selectively varying the position of said operating portion.

4. A device for proportioning different temperature fluids comprising a valve body having a pair of juxtaposed inlet passages for different temperature fluids, a pair of oppositely disposed valve seats in said body having openings communicating with said inlet passages respectively, a pair of valve members cooperable with said valve seats respectively for controlling flow of fluid through said openings, a pair of electromagnets mounted on said body for operating said valve members respectively, a substantially cylindrical hollow projection on said body opposite said inlet passages and communicating with said openings to form a single outlet therefor, support means secured to said body and being apertured to receive said projection, a substantially cylindrical bimetal element extending around said projection and subject to the temperature of the fluid in said outlet, said element having a relatively stationary end secured to said support means and a free end movable in response to temperature variations in the outlet fluid, a pair of switch means mounted on said support means and operably associated with said free end for alternative operation thereby, and circuit connections between said switch means and said electrically operable means effective for causing alternative operation of said valve members for proportioning the flow of fluids from said inlet passages to said outlet.

References Cited in the file of this patent

UNITED STATES PATENTS

| | | |
|---|---|---|
| 1,720,723 | Dodge | July 16, 1929 |
| 2,146,930 | Bassett | Feb. 14, 1939 |
| 2,280,667 | Scott et al. | Apr. 21, 1942 |
| 2,432,965 | Corke | Dec. 16, 1947 |
| 2,511,792 | Suska | June 13, 1950 |
| 2,540,444 | Harland | Feb. 6, 1951 |
| 2,619,284 | Clegg et al. | Nov. 25, 1952 |
| 2,712,324 | Lund | July 5, 1955 |